(12) United States Patent
Chen

(10) Patent No.: US 11,776,297 B2
(45) Date of Patent: Oct. 3, 2023

(54) COORDINATE TRANSFORMATION METHOD USED FOR IMAGING UNDER SCREEN, STORAGE MEDIUM AND ELECTRONIC DEVICE

(71) Applicant: SHANGHAI HARVEST INTELLIGENCE TECHNOLOGY CO., LTD., Shanghai (CN)

(72) Inventor: Zongwen Chen, Shanghai (CN)

(73) Assignee: SHANGHAI HARVEST INTELLIGENCE TECHNOLOGY CO., LTD., Shanghai (CN)

( * ) Notice: Subject to any disclaimer, the term of this patent is extended or adjusted under 35 U.S.C. 154(b) by 202 days.

(21) Appl. No.: 17/275,305

(22) PCT Filed: Jul. 3, 2019

(86) PCT No.: PCT/CN2019/094571
§ 371 (c)(1),
(2) Date: Mar. 11, 2021

(87) PCT Pub. No.: WO2020/052328
PCT Pub. Date: Mar. 19, 2020

(65) Prior Publication Data
US 2022/0122372 A1   Apr. 21, 2022

(30) Foreign Application Priority Data

Sep. 12, 2018 (CN) .......................... 201811062109.2

(51) Int. Cl.
*G06V 40/13* (2022.01)
*G06T 5/00* (2006.01)
*G06V 40/12* (2022.01)

(52) U.S. Cl.
CPC .......... *G06V 40/1318* (2022.01); *G06T 5/001* (2013.01); *G06V 40/1324* (2022.01);
(Continued)

(58) Field of Classification Search
None
See application file for complete search history.

(56) References Cited

U.S. PATENT DOCUMENTS

2009/0190008 A1   7/2009   Kasahara
2018/0046281 A1   2/2018   Pi et al.
(Continued)

FOREIGN PATENT DOCUMENTS

CN   1305143 A   7/2001
CN   104331715 A   2/2015
(Continued)

OTHER PUBLICATIONS

International Search Report, issued in PCT/CN2019/094571, PCT/ISA/210, dated Oct. 9, 2019.

*Primary Examiner* — Joseph R Haley
(74) *Attorney, Agent, or Firm* — Birch, Stewart, Kolasch & Birch, LLP

(57) ABSTRACT

This invention is related to a technical field of optical fingerprint recognition. It particularly designs a coordinate transformation method for imaging under screen, a storage medium and an electronic device. The a [sic] coordinate transformation method for imaging under screen includes steps of: calculating a coordinate system shrink coefficient; copying each luminous point in a fingerprint image to a shrunken coordinate system; and moving the entirety to the shrunken coordinate system with a relative distance between fingerprint information around a luminous point and a center of the luminous point being kept unchanged. Through coordinate transformation, restoration of the fingerprint image is guaranteed, and also pixels are guaranteed to not be lost at the same time, thereby ensuring the definition of the fingerprint image thus restored. In addition, this manner for
(Continued)

restoring fingerprint images is simple in calculation process, fast in restoration speed, and good in quality.

12 Claims, 5 Drawing Sheets

(52) U.S. Cl.
CPC ............... *G06V 40/1335* (2022.01); *G06T 2207/20021* (2013.01); *G06T 2207/30196* (2013.01)

(56) References Cited

U.S. PATENT DOCUMENTS

| | | | |
|---|---|---|---|
| 2018/0219049 A1* | 8/2018 | Zhu | ............... G06V 40/1318 |
| 2019/0064989 A1* | 2/2019 | Liu | ............... H01L 27/14643 |
| 2020/0065555 A1 | 2/2020 | Zhou | |

FOREIGN PATENT DOCUMENTS

| | | | |
|---|---|---|---|
| CN | 107239737 A | 10/2017 |
| CN | 107403171 A | 11/2017 |
| CN | 107580709 A | 1/2018 |

\* cited by examiner

COORDINATE TRANSFORMATION METHOD USED FOR IMAGING UNDER SCREEN, STORAGE MEDIUM AND ELECTRONIC DEVICE

TECHNICAL FIELD

The present invention is related to a technical field of optical fingerprint recognition, and especially related to a coordinate transformation method for imaging under screen, a storage medium and an electronic device.

BACKGROUND ART

As information technology develops, biometric identification technology plays a more and more important role in an aspect of ensuring information security, wherein fingerprint recognition has become one of the key technical measures for identification and device-unlocking that are widely applied in the field of mobile networking. Under the trend that the screen-to-body ratios of appliances get larger and larger, conventional capacitive fingerprint recognition has failed to meet the requirements, and ultrasonic fingerprint recognition has problems in aspects of technical maturity, cost, etc. Optical fingerprint recognition is expected to become a major technical scheme of under-screen fingerprint recognition.

An existing scheme for optical fingerprint recognition is based on principles of geometric optical lens imaging, and fingerprint modules used therein include components such as a microlens array and an optical spatial filter, and have many drawbacks such as having complicated structure, thick module, small sensing range and high cost. In comparison to the existing optical fingerprint scheme, implementing lens-free under-screen optical fingerprint recognition through principles of total reflection imaging of physical optics has advantages such as having simple structure, thin module, large sensing range and low cost. However, planar coordinate systems in which a fingerprint image and a real fingerprint respectively reside do not have a 1:1 corresponding relationship, so how to accurately rebuild a fingerprint with high efficiency is crucial.

CONTENT OF INVENTION

Therefore, providing a coordinate transformation method for imaging under screen is needed, in order to solve the problem that the fingerprint image obtained by lens-free under-screen optical fingerprint recognition is inconsistent with the real fingerprint. A specific technical scheme is described below:

A coordinate transformation method for imaging under screen includes steps of: calculating a coordinate system shrink coefficient; copying each luminous point in a fingerprint image to a shrunken coordinate system; moving the entirety to the shrunken coordinate system with a relative distance between fingerprint information around a luminous point and a center of the luminous point being kept unchanged.

Furthermore, the "moving the entirety to the shrunken coordinate system with a relative distance between fingerprint information around a luminous point and a center of the luminous point being kept unchanged" further includes a step of: dividing the fingerprint image into regions based on different ways for obtaining the fingerprint image, and moving, for each region, the fingerprint information in the region to the shrunken coordinate system with the relative distance between the fingerprint information around a luminous point in the region and the center of the luminous point being kept unchanged.

Furthermore, before "calculating a coordinate system shrink coefficient", a step is further included: processing the fingerprint image to decide a circular dark region corresponding to any point light source, wherein the circular dark region has a diameter of D, and calculating a screen thickness coefficient based on a value of D.

Furthermore, the "processing the fingerprint image to decide a circular dark region corresponding to any point light source" further includes a step of: deciding a position of a bright spot corresponding to a point light source in the fingerprint image, and using the bright spot as a center of a circle to gradually and outwardly scan, wherein an edge where a scanned average grayscale value just meets a maximum value is regarded as the circumference of the circular dark region.

Furthermore, before the "processing the fingerprint image", multiple steps are further included: lighting up pixel points of multiple separate point light source regions of a display panel, wherein the point light source regions are arranged in an array and are spaced by nonluminous pixel points, and the point light source regions include multiple pixel points; obtaining, through a light sensor, light of a pixel point that is totally reflected through a non-opaque cover plate; wherein the display panel and the light sensor are placed under the non-opaque cover plate.

Furthermore, the array arrangement is lateral arrangement and longitudinal arrangement, or the array arrangement is ring arrangement.

Furthermore, an interval between two adjacent point light sources meets a condition that point light source total reflection images that are collected by the light sensor do not contact and do not repeat.

Furthermore, the display panel is a liquid-crystal display, an active-matrix organic light-emitting diode display or a micro light-emitting diode display.

In order to solve the above-mentioned problem, a storage medium is further provided. A specific technical scheme is as follows:

A storage medium, the storage medium stores a computer program, wherein the computer program when executed by a processor performs any step of the above-mentioned method thus described.

In order to solve the above-mentioned problem, an electronic device is further provided. A specific technical scheme is as follows:

An electronic device includes storage and a processor, wherein a computer program is stored in the storage, and the computer program when executed by the processor performs any step of the above-mentioned method thus described.

A beneficial effect of the present invention lies in: obtaining a new coordinate system through calculating a coordinate system shrink coefficient, moving each luminous point (i.e., the image that the point light source corresponds to) in a fingerprint image to a shrunken coordinate system, and then moving the entirety to the shrunken coordinate system with a relative distance between fingerprint information around a luminous point and a center of the luminous point being kept unchanged. Through coordinate transformation, restoration of the fingerprint image is guaranteed, and also pixels are guaranteed to not be lost at the same time, thereby ensuring the definition of the fingerprint image thus restored. In addition, this manner for restoring fingerprint images is simple in calculation process, fast in restoration speed, and good in quality.

DESCRIPTION OF ACCOMPANYING FIGURES

DESCRIPTION OF SYMBOLS OF THE ACCOMPANYING FIGURES

900 storage medium,
100 electronic device,
101 storage,
102 processor.

Specific Implementation Manner

In order to describe the technical content, structural features, achieved goals and effects of the technical scheme(s) in detail, the following provides detailed description in combination with specific embodiments and the accompanying figures.

The most essential technical concept of the present invention lies in: calculating an amplifying coefficient k for an under-screen-image imaging structure. When the obtained fingerprint image is simply shrunken k times, a fingerprint image that has a size identical to the real fingerprint can indeed be obtained, but its definition would be seriously affected because of lost pixels. Therefore, the present invention, mainly through transformation of coordinate systems, moves the fingerprint image obtained through the under-screen-image imaging structure into a new coordinate system (shrunken k times), which can guarantee that the final fingerprint image thus obtained has a size that is identical to the real fingerprint, and that its definition is not the least bit affected.

Figure 1:
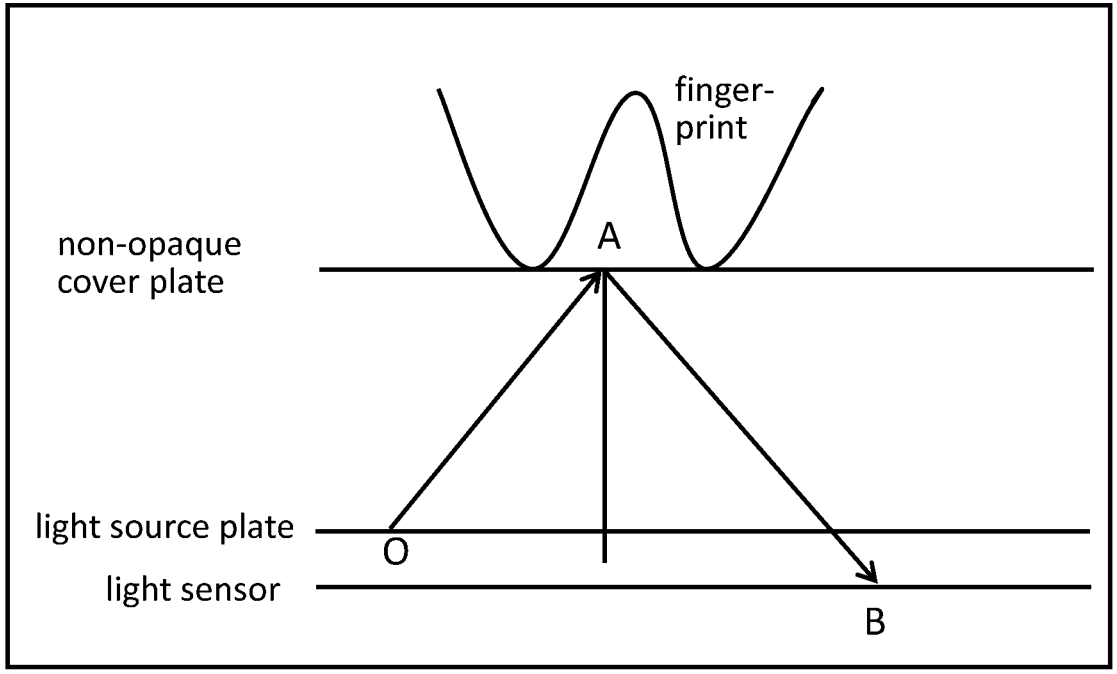
FIG. 1 is a schematic diagram of implementing lens-free under-screen optical fingerprint imaging by using principles of total reflection imaging.

In this embodiment, the fingerprint image under processing is obtained by a particular under-screen-image imaging structure. First, a brief description of the under-screen-image imaging structure is provided:

As shown in FIG. 1, the under-screen-image imaging structure includes a non-opaque cover plate, a light source plate and a light sensor. The light source plate and the light sensor are disposed under the non-opaque cover plate, wherein, the non-opaque cover plate may be a single-layer structure or a multi-layer structure. The single-layer structure may be a glass cover plate or a cover plate of an organic non-opaque material. The single-layer structure may also be a cover plate that has other function(s), for example, a touch screen. The multi-layer iso structure may be multiple layers of glass cover plates or multiple layers of cover plates of organic non-opaque material(s), or a combination of a glass cover plate with a cover plate of an organic non-opaque material. The light sensor is used for obtaining light, includes multiple light-sensing units, and can be individually disposed under the light source plate or disposed on the light source plate. When being disposed under the light source plate, light can pass through gaps among light sources on the light source plate and enter the light sensor. When being disposed on the light source plate, the light-sensing units can be disposed in the light source gaps of the light source plate. The sensor may be disposed in the under-screen-image imaging structure for obtaining an under-screen image, for example, for obtaining fingerprints or palm prints. The non-opaque cover plate and the light source plate need to be connected by filling optical cement, in order to prevent reflection of the light from being affected by air. The refractive index of the optical cement should be close to the refractive index of the non-opaque cover plate, in order to prevent total reflection of the light from occurring between the optical cement and the non-opaque cover plate.

Figure 2:
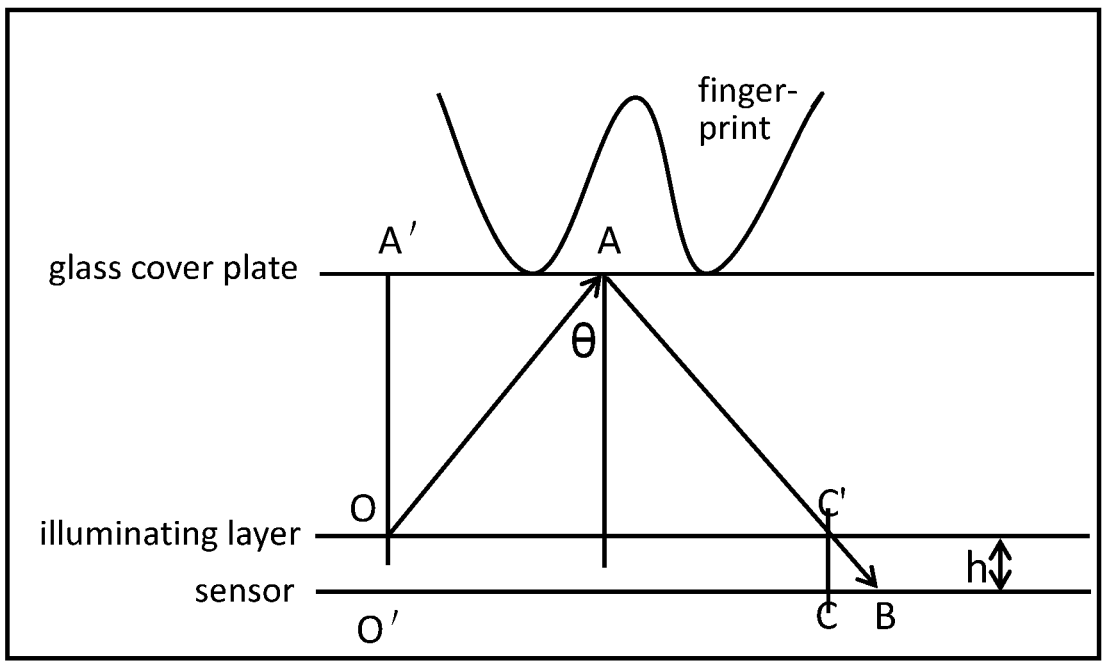
FIG. 2 is a schematic diagram of optical fingerprint imaging with a non-opaque cover plate that is a glass cover plate.

As shown in FIG. 2, in this embodiment, the non-opaque cover plate is exemplified by a glass cover plate. In that case, when a fingerprint is being obtained, a certain point A on the glass cover plate (cover glass) that is pressed by a finger is to be imaged onto a point B on a surface of the sensor. Based on conditions of the total reflection, the light emitted by a single illuminating point O on the light source plate is just sufficient to satisfy the needs.

In this way, for any fingerprint image point B on the imaging sensor, in order to restore the corresponding fingerprint point A on the glass cover plate, the image point B has to be retracted towards the corresponding illuminating point O with the point O as a center according to a certain ratio relationship, such that a horizontal distance $\|OB\|$ between the point B and the point O and a horizontal distance $\|OA\|$ between the point A and the point O satisfy the ratio relationship of: $\|OB\|=k\|OA\|$, wherein the value of the ratio coefficient k is determined based on the optical structure of the system.

In FIG. 2, θ is the angle of incidence, the distance between the illuminating layer and the sensor is h, and the thickness of the glass cover plate is H. The amplifying coefficient of the system can be obtained by analysis:

$$k = \frac{\|OB\|}{\|OA\|} = \frac{2\|OA\| + \|BC\|}{\|OA\|} = 2 + \frac{\|BC\|}{\|OA\|} = 2 + \frac{h\tan\theta}{H\tan\theta} = 2 + \frac{h}{H}$$

Figure 3:
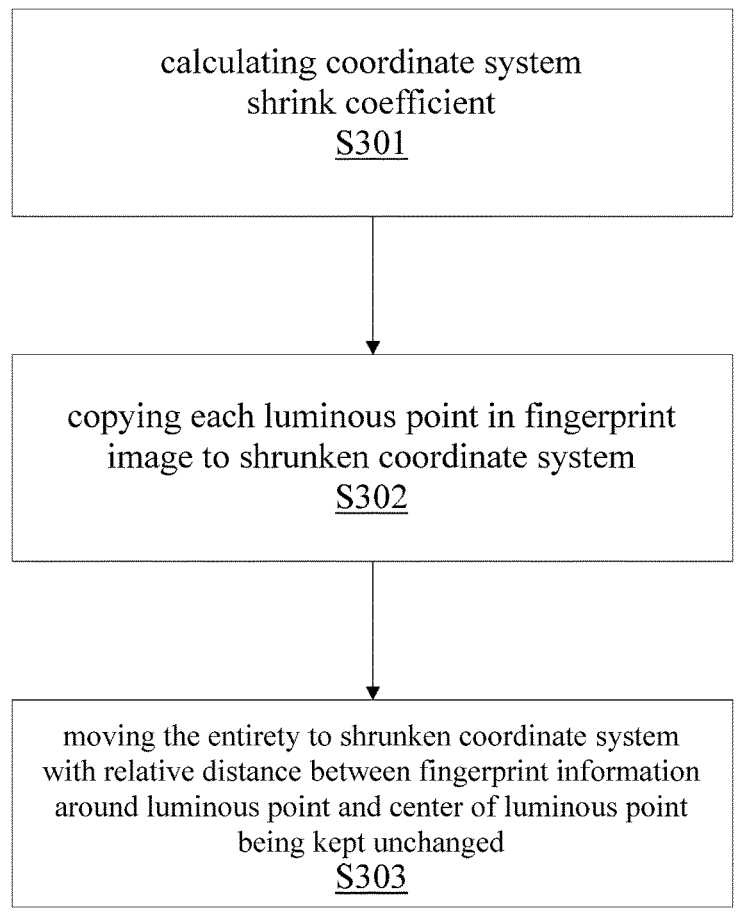
FIG. 3 is a flow chart of a coordinate transformation method for imaging under screen.

Based on the above-mentioned principles, please refer to FIG. 3, in this embodiment, a specific way to perform a coordinate transformation method for imaging under screen is as follows:

Step S301: calculating a coordinate system shrink coefficient. The amplifying coefficient of the system that is obtained as described above is the coordinate system shrink coefficient.

Step S302: copying each luminous point in a fingerprint image to a shrunken coordinate system. It needs to be explained that the luminous point mentioned therein is an image formed directly by a point light source of the illuminating layer in the under-screen-image imaging structure at a position on the sensor directly below, for example, O' in FIG. 2. A specific coordinate transformation relationship of the luminous point is given below:

The original coordinate of the luminous point is (x,y), and the coordinate of the luminous point in a new coordinate system is $$X = x \cdot k;$$

$$Y = y \cdot k$$

Step S303: moving the entirety to the shrunken coordinate system with a relative distance between fingerprint information around the luminous point and a center of the luminous point being kept unchanged.

Through calculation of the coordinate system shrink coefficient, the new coordinate system is obtained, each luminous point (i.e., the image to which each point light source corresponds) of the fingerprint image is moved to the shrunken coordinate system, and then the entirety is moved to the shrunken coordinate system with a relative distance between the fingerprint information around the luminous point and the center of the luminous point being kept unchanged. Through transformation of coordinates, restoration of the fingerprint image is guaranteed, and it is guaranteed at the same time that pixels will not be lost, thereby ensuring the definition of the restored fingerprint image. In addition, this manner for restoring fingerprint images is simple in calculation process, fast in restoration speed, and good in quality.

From the following equation, $$k = \frac{\|OB\|}{\|OA\|} = \frac{2\|OA\| + \|BC\|}{\|OA\|} = 2 + \frac{\|BC\|}{\|OA\|} = 2 + \frac{h \tan\theta}{H \tan\theta} = 2 + \frac{h}{H}$$

it can be seen that calculating the coordinate system shrink coefficient k needs to use the screen thickness coefficient H, and this coefficient may change because of a user preference of attaching a film on the screen. In this embodiment, preferably, the screen thickness coefficient is calculated as follows:

processing the fingerprint image to decide a circular dark region corresponding to any point light source, and calculating the screen thickness coefficient based on the value of D, wherein the circular dark region has a diameter of D.

Preferably, the circular dark region corresponding to any point light source is decided through the following steps:

deciding a position of a bright spot corresponding to a point light source in the fingerprint image, and scanning gradually and outwardly with the bright spot serving as a center of a circle, wherein an edge where a scanned average grayscale value just reaches a maximum value is regarded as the circumference of the circular dark region.

Figure 4:
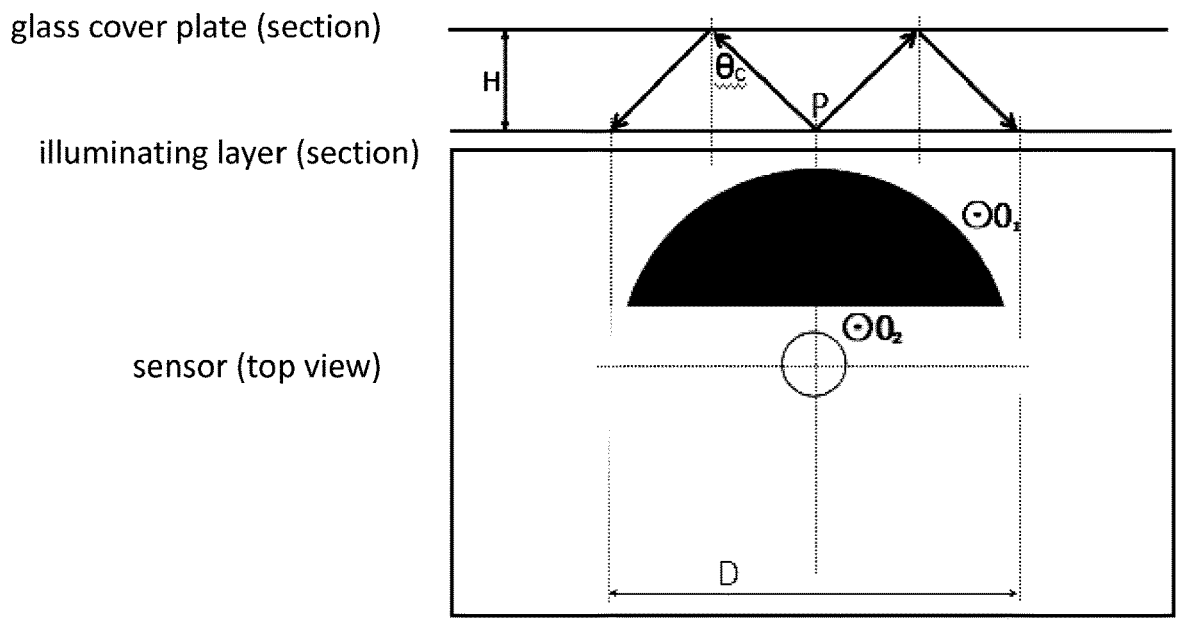
FIG. 4 is a schematic diagram of principles of formation of a circular dark region.

A specific calculation principle of the dark region diameter D is described as follows in combination with FIG. 4: $\theta_c$ is a critical angle for the light emitted by the point light source P to be reflected on the glass cover plate. When the angle of incidence is less than $\theta_c$, most of the light passes through the glass cover plate with refraction, so no clear reflected light can be detected by the sensor, and so on the sensor, a circular dark region around the point light source P is formed (a bright spot is formed at the center of the dark region because the light that lights up the point light source P is cast directly to the sensor). The outside diameter of the dark region is denoted by D, the thickness of the cover plate glass is denoted by H, and the thickness of the glass plate can be calculated based on a trigonometric function:

$$H = \frac{D}{4\tan\theta_c} \quad (3)$$

In addition, the critical angle for total reflection is calculated as follows:

When light is cast from an optically denser medium to an optically thinner medium, the angle of refraction is larger than the angle of incidence. When the angle of incidence increases to a certain angle $\theta_c$ such that the angle of refraction reaches 90°, the refracted light disappears. When the angle of incidence is larger than $\theta_c$, there is only reflected light, this phenomenon is called total reflection, and the corresponding angle of incidence $\theta_c$ is called the critical angle for total reflection.

When light travels to vacuum (having a refractive index of 1) from glass that has a refractive index of n, the law of refraction is $$\sin\theta_i = n \times \sin\theta_t \quad (1)$$

wherein $\theta_i$ and $\theta_t$ are the angle of incidence and the angle of refraction, respectively. When the angle of incidence $\theta_i$ equals the critical angle $\theta_c$, $$\sin\theta_c = \frac{1}{n}$$

is obtained by bringing the angle of refraction $\theta_t = 90°$ into equation 1, and the critical angle is:

$$\theta_c = \arcsin\frac{1}{n} \quad (2)$$

Therefore, as long as the diameter D of the circular dark region is known, the screen thickness coefficient can be automatically calculated in real-time based on the value of D.

In order to guarantee the definition of the fingerprint image obtained in this embodiment, before "processing the fingerprint image", the following steps are included:

Lighting up pixel points of multiple separate point light source regions of a display panel, wherein the point light source regions are arranged in an array and are spaced apart by nonluminous pixel points, and the point light source regions include multiple pixel points; obtaining, through a light sensor, light of a pixel point that is totally reflected through a non-opaque cover plate; wherein the display panel and the light sensor are placed under the non-opaque cover plate. In this embodiment, the multiple separate point light source regions may light up multiple regions on the non-opaque cover plate, and then the light that has been totally reflected by the non-opaque cover plate can be obtained by the light sensor. In this way, images of multiple regions can be obtained, and efficiency of obtaining images is increased. At the same time, the point light source regions include multiple pixel points, thereby satisfying the requirement for illumination brightness for imaging, so that collection of image(s) on the non-opaque cover plate can be realized. Usability of the collected fingerprint image is guaranteed.

Figure 5:
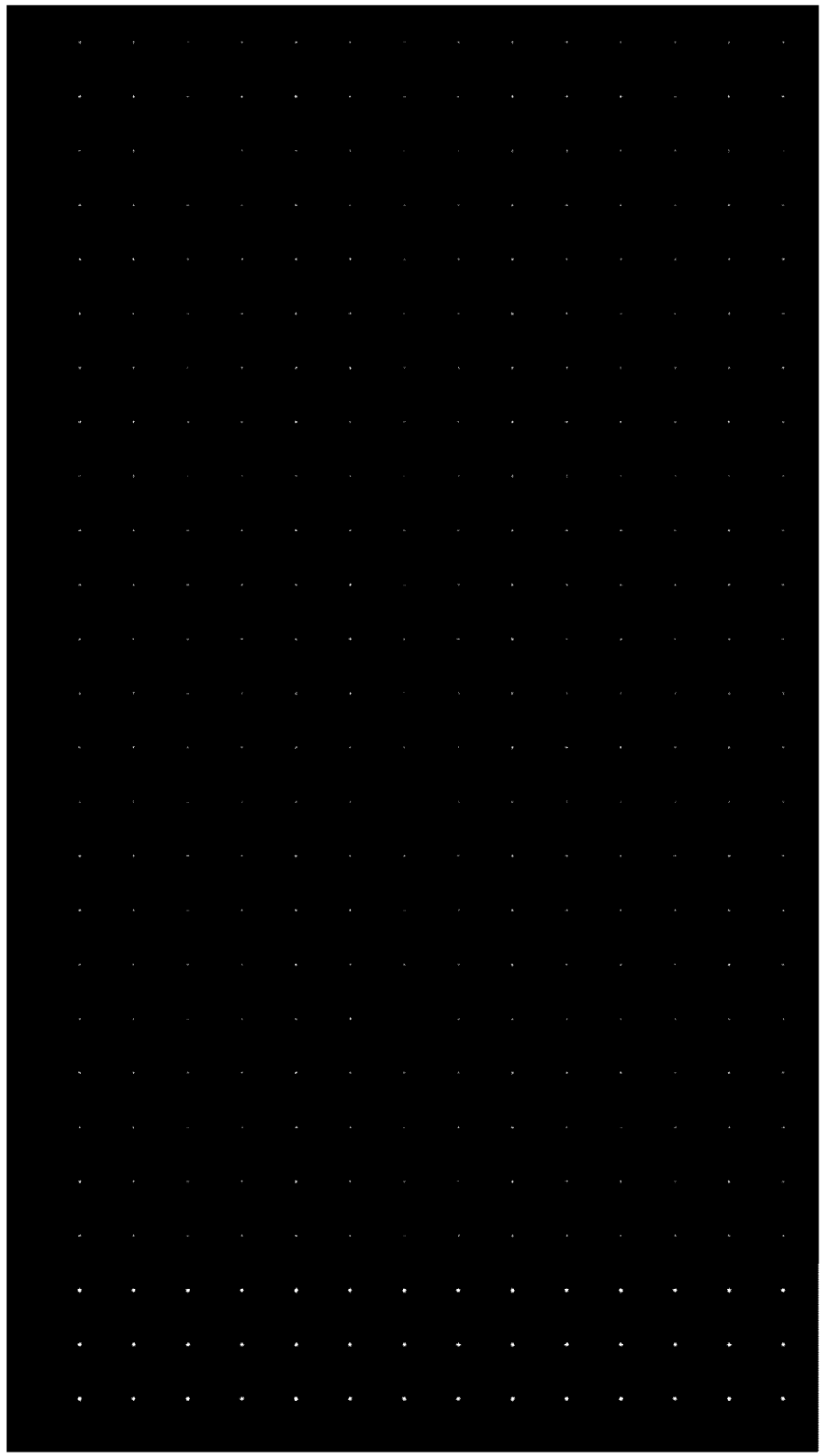
FIG. 5 is a schematic diagram of an array of multiple separate point light source regions of a display panel.

The point light sources of this embodiment can be arranged in multiple ways, a preferable one among which is uniform arrangement where distances each between two adjacent point light sources are equal, so that the reflected image of every point light source is the same, which facilitates subsequent image processing. A specific way of the arrangement may be lateral arrangement and longitudinal arrangement, or the array arrangement may be ring arrangement. The lateral arrangement refers to multiple point light sources constituting multiple parallel lateral lines and multiple parallel longitudinal lines. As shown in FIG. 5 where the white points therein are the point light sources, the lateral lines and the longitudinal lines are preferably perpendicular to each other, but of course, a certain included angle (e.g., 60°, etc.) may appear in some embodiments. The ring arrangement may refer to point light sources positioned on circles with the center of the screen as a center of the circles and with gradually increasing radiuses.

Figure 6:
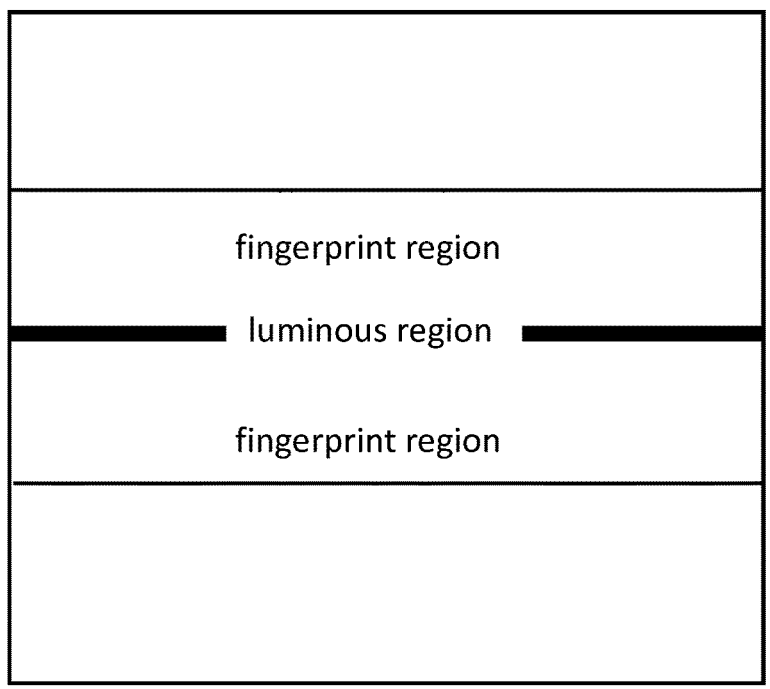
FIG. 6 is a schematic diagram of a fingerprint that is collected by a sensor under the point light sources that light up the same linearity region according to an embodiment.

In this embodiment, because there are various array-arrangements of the point light sources, each time a fingerprint image is obtained, the point light sources that glow are different. As the fingerprint images are obtained in different ways, there are differences in distribution of the obtained fingerprint images, and therefore specific processes that are used in conducting coordinate transformation are also different. The following description is given:

In this embodiment, specifically, the above-mentioned step S303 is further to divide the fingerprint image into regions based on different ways of obtaining the fingerprint image, and to move, for each region, the fingerprint information in the region to the shrunken coordinate system with a relative distance between fingerprint information around a luminous point in the region and a center of the luminous point being kept unchanged. The details may be as follows:

What is shown in FIG. 6 is point light sources on the light source plate that light up a same linearity region. Therefore, the collected fingerprint images are mainly distributed over the two sides of the straight line. In this situation, each fingerprint section is demarcated based on how many fingerprints can be made by each straight line (the point light sources that are arranged in the straight line). After that, the luminous points of the region are first moved to the shrunken coordinate system, and then for each region, the entirety of the region is moved to the shrunken coordinate system with the relative distance between the fingerprint information around the luminous point in the region and the center of the luminous point being kept unchanged.

Figure 7:
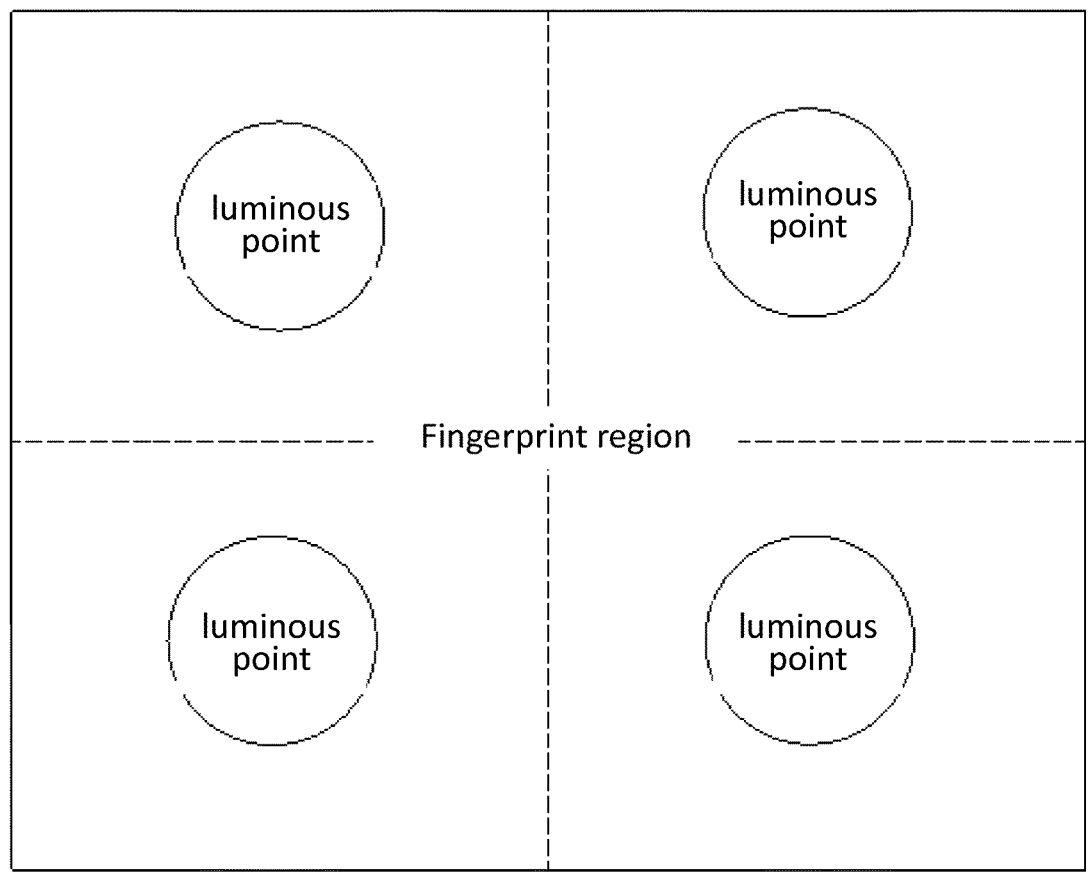
FIG. 7 is a schematic diagram of a fingerprint that is collected on a sensor under a condition that four luminous points are lighted up according to an embodiment.

What is shown in FIG. 7 is a schematic diagram of a fingerprint that is collected on a sensor under a condition that four luminous points (point light sources) are lit up, wherein the fingerprint is mainly at a region among the luminous points. The whole picture is divided into several equally-sized sections with adjacent luminous points as centers, and coordinates of a center of the luminous point of each section are found. The luminous points are first moved to the new coordinate system, and then for each region, fingerprint information of the region is moved to the shrunken coordinate system with the relative distance between the fingerprint information around the luminous point in the region and the center of the luminous point being kept unchanged.

In other embodiments, the number of the point light sources that are lit up may be different and is not necessarily four. Similarly, the whole picture is divided into several equal-sized sections with adjacent luminous points as centers, and coordinates of a center of the luminous point of each section are found. The luminous points are first moved to the new coordinate system, and then for each region, fingerprint information of the region is moved to the shrunken coordinate system with the relative distance between the fingerprint information around the luminous point in the region and the center of the luminous point being kept unchanged.

In this embodiment, the interval of the point light sources depends on imaging quality. In order to prevent overlap between imaging, the interval between two adjacent point light sources satisfies a condition that point light source total reflection images that are collected by the light sensor do not contact and do not repeat. Preferably, the interval of the point light sources may take a minimum value under the condition that total reflection images of two adjacent point light sources do not contact and do not repeat. This minimum value can be obtained through multiple times of manual testing by, for example, obtaining total reflection images of point light sources with different intervals of the point light sources, and then checking a minimum value of an interval of the point light sources in reflection image(s) satisfying the condition of no contact and no repeat. Afterwards, said minimum value can be preset in a storage device used to perform the present method. In reality, the interval of the point light sources may be affected by the interval between the light source and the cover plate, and these two intervals have a positive proportional relationship. In practical applications, screen hardware coefficients of a product usually do not change, so for these particular screens, adopting multiple manual testing for the attainment is more direct and convenient.

Just as described above, the present invention combines multiple pixel points to form a synthesized point light source having overall brightness that satisfies the imaging requirement. At the same time, the outer shape of the point light source also affects the imaging quality. The point light source is preferably to have a round-like shape. Because in practical, every pixel has a square shape, a combination of multiple pixels cannot form a standard round shape, and can only form a round-like shape that is close to a round shape. Determination of pixel points of a round-like shape can be made by drawing a circle with a certain pixel point serving as the center. The pixel points inside the circle can all be considered as the pixel points of the round-like shape. A predetermined ratio of area occupied by pixel points on the circumference can be set. When a ratio of the area inside the circle that is occupied by the circumference pixel points to the total area of the pixel points is larger than the predetermined ratio of area, the pixel points are considered as pixel points of the point light source for the round-like shape. The size of the circle determines light intensity of the point light source and whether the light sensor is able to obtain images with better quality. If the circle is too small, the point light source region would be too small, thereby producing insufficient light; if the circle is too big, the point light source region would be too small, thereby affecting imaging quality. Similarly, different display panels may have different light source intensities, so the size of the point light source region also varies from display panel to display panel. For a particular image-imaging-obtaining structure, the size of the point light source region can also be obtained by adopting multiple manual testing. The size of the point light source region can be lit up in a small-to-large order. Then, after the light sensor has obtained image data, a smallest point light source region with a satisfying imaging quality is manually selected.

Figure 8:
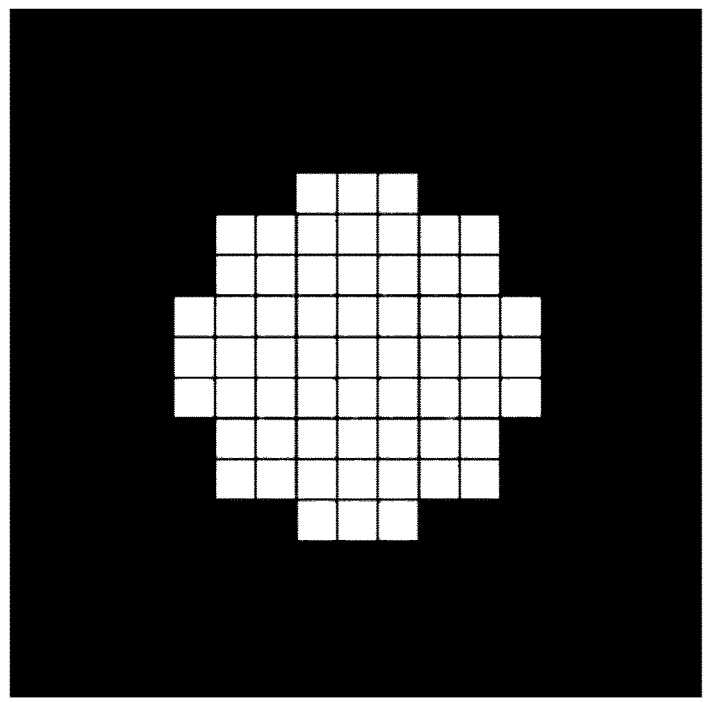
FIG. 8 is a distribution graph of pixel points included in a point light source according to an embodiment.

With existing display panels, preferable size and shape of a real point light source are shown in accompanying FIG. 8 (each grid represents a pixel, and positions of light sources are indicated by the white color), where a rectangle of 7 pixel*7 pixel is in the middle with a projection of three pixels in the middle of each side of the rectangle, which can achieve better imaging quality.

A preferable color of the light source is green, red or any color combination of a color between these two colors and another color; such colors may avoid interference of external light.

Display panels can be used not only as light sources to emit light, but also function to display images. Display panels include liquid-crystal displays (LCDs), active-matrix organic light-emitting diode (AMOLED) displays or micro light-emitting diode (micro-LED) displays; they each scan and drive a single pixel by a thin-film transformer (TFT) structure, and can achieve single driving for a pixel point, thereby achieving driving of the point light source and array-displaying, and allowing light to enter the light sensor after passing through gaps among pixel points.

The point light source array structure of this embodiment can be drawn using various ways of generation, for example, using graphic software, and then is displayed by a display panel; however, because accuracy requirement of a dot matrix is high, and because the number of points is relatively large, drawing efficiency of this method is low. Alternatively, the following manner may be used: before lighting up the pixel points, further included is a step of performing value-assignment for a matrix that has a same resolution as that of the display panel, wherein non-zero values are assigned to point light source regions, zero is assigned to the other regions, and the matrix that has assigned values serves as RGB information for generating a display image; the display image is transmitted to the display panel. After that, the following steps are performed: lighting up pixel points of multiple separate point light source regions of the display panel, wherein the point light source regions are arranged in an array and are spaced apart by nonluminous pixel points, and the point light source regions include multiple pixel points; and obtaining, through the light sensor, light of the pixel points that is totally reflected through the non-opaque cover plate. The display panel and the light sensor are placed under the non-opaque cover plate.

This embodiment takes the active-matrix organic light-emitting diode (AMOLED) display (1920×1080 pixels) as an example to illustrate generation of a point light source array structure. A programming language is used with this parameter to design a light source topology structure. The procedure of using the programming language to design the light source topology structure is in fact to assign values to a 1920*1080 matrix (a matrix that has 1920 rows, 1080 columns and all-zero data) by assigning a non-zero value (e.g., 255) to positions that need to be lit up and assigning a value of 0 otherwise, and then to use this matrix as RGB information of an 8-bit image (in the RGB information of an 8-bit image, a datum of 0 represents a black color, and a datum of 255 represents a fully saturated color) to generate a new image. A point light source array structure thus generated is shown in accompanying FIG. 5, wherein the white color represents the point light source region. The color of white is used only for graphic illustration, and can actually be green or red. Through the above-mentioned steps, a point light source array structure as needed may be generated with high efficiency, and thereby high-speed point light source driving may be achieved.

Although multiple pixel points are used to form one point light source and light up a fingerprint simultaneously, a single imaging cannot seamlessly scan the whole fingerprint. Using multiple point light source arrays that are complementary to one other may realize seamless scan, but the fingerprint image obtained by using each point light source array for illumination still has a fingerprint image portion lost. In order to obtain a complete fingerprint image, the present invention utilizes time-division multiplexing to realize full fingerprint coverage. Specifically, after a predetermined time interval, a same position offset is performed on all point light source regions; the step of lighting up pixel points and the step of obtaining light are repeated again until fingerprint images that satisfy a complete fingerprint splicing requirement, and then, after performing noise deduction and splicing on these fingerprint images, the complete fingerprint image can be obtained. Through the above-mentioned fingerprint image thus obtained, accuracy of subsequent screen thickness coefficient calculation is guaranteed, and thereby accuracy of coordinate system transformation is further guaranteed, so that precision of image restoration is guaranteed.

Figure 9:
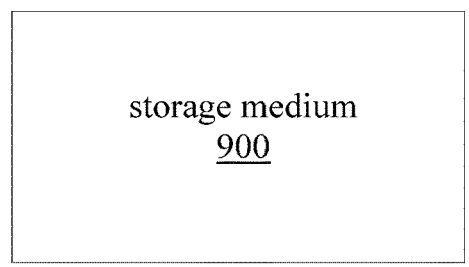
FIG. 9 is a block diagram of a storage medium.

Please refer to FIG. 9. In this embodiment, an embodiment of a storage medium 900 is as follows:

The storage medium 900 of this embodiment may be a storage medium 900 that is disposed in an electronic device, and the electronic device may read the content of the storage medium 900 and achieve the effects of the present invention. Further, the storage medium 900 may be an independent storage medium 900, and by connecting the storage medium 900 and the electronic device, the electronic device is able to read the content in the storage medium 900 and to perform the method steps of the present invention.

The storage medium 900 includes but not limited to: RAM, ROM, a magnetic disk, a magnetic tape, an optical disk, flash memory, a USB disk, a portable hard disk, a memory card, a memory stick, network server storage, a network cloud server, etc.

The storage medium 900 stores a computer program. The computer program when executed by a processor performs steps of the method described in any item mentioned above.

Figure 10:
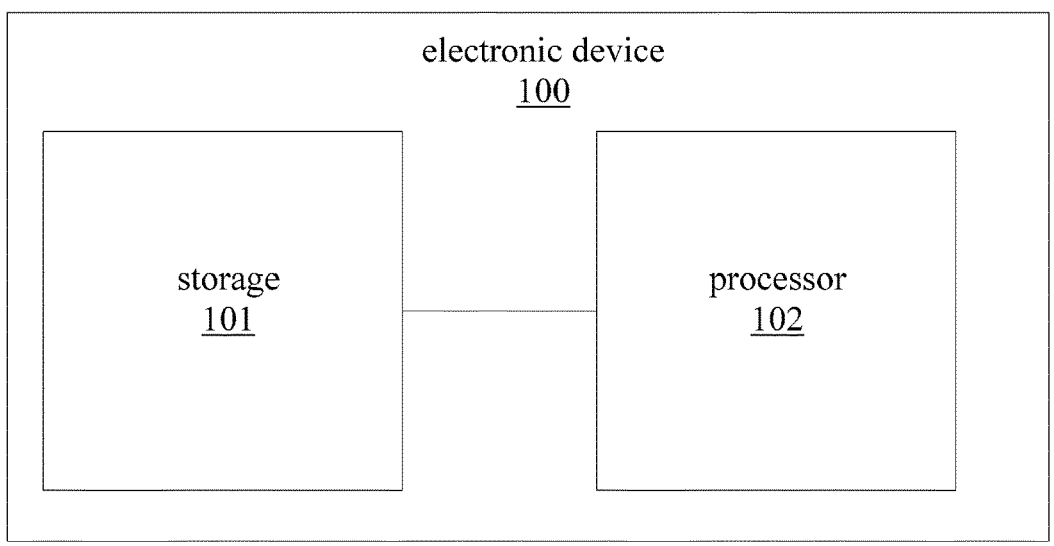
FIG. 10 is a block diagram of an electronic device.

Please refer to FIG. 10. In this embodiment, a specific embodiment of an electronic device 100 is as follows:

The electronic device 100 includes but not limited to: a personal computer, a server, a general purpose computer, a special purpose computer, a network device, an embedded device, a programmable device, a smart mobile terminal, a smart home appliance, a wearable smart device, a vehicle smart device, etc.

The electronic device 100 includes storage 101 and a processor 102. The storage 101 has a computer program stored therein. The computer program when executed by the processor 102 performs steps of the method described in any item mentioned above.

It needs to be made clear that although description with respect to each above-mentioned embodiment has been given in this specification, the patent protection scope of the present invention is not limited thereby. Therefore, based on the novel idea of the present invention, any alteration or modification made to the embodiments described in this specification, or equivalent structure or equivalent flow change that is made by using the content of the specification and the accompanying figures of the present invention, directly or indirectly applying the above-mentioned technical schemes in other related technical fields, are each included in the patent protection scope of the present invention.

The invention claimed is:

1. A coordinate transformation method for imaging under screen, characterized by comprising steps of:
    calculating a coordinate system shrink coefficient;
    copying each luminous point in a fingerprint image to a shrunken coordinate system;
    moving the entirety to the shrunken coordinate system with a relative distance between fingerprint information around a luminous point and a center of the luminous point being kept unchanged.

2. The coordinate transformation method for imaging under screen of claim 1, characterized in that, the step of moving the entirety to the shrunken coordinate system with a relative distance between fingerprint information around a luminous point and a center of the luminous point being kept unchanged further includes steps of:

dividing the fingerprint image into regions based on different ways for obtaining the fingerprint image, and moving, for each region, the fingerprint information in the region to the shrunken coordinate system with the relative distance between the fingerprint information around the luminous point in the region and the center of the luminous point being kept unchanged.

3. The coordinate transformation method for imaging under screen of claim 1, characterized in that, before the step of calculating a coordinate system shrink coefficient, a step is further included:

processing the fingerprint image to decide a circular dark region corresponding to any point light source, the circular dark region having a diameter of D, and calculating a screen thickness coefficient based on a value of D.

4. The coordinate transformation method for imaging under screen of claim 3, characterized in that, the step of processing the fingerprint image to decide a circular dark region corresponding to any point light source further includes a step of:

deciding a position of a bright spot corresponding to a point light source in the fingerprint image, and scanning gradually and outwardly with the bright spot serving as a center of a circle, an edge where a scanned average grayscale value just reaches a maximum value being regarded as the circumference of the circular dark region.

5. The coordinate transformation method for imaging under screen of claim 3, characterized in that, before the step of processing the fingerprint image, multiple steps are further included:

lighting up pixel points of multiple separate point light source regions of a display panel, wherein the point light source regions are arranged in an array and are spaced apart by nonluminous pixel points, the point light source regions including multiple pixel points;

obtaining, through a light sensor, light of a pixel point that is totally reflected through a non-opaque cover plate, the display panel and the light sensor being placed under the non-opaque cover plate.

6. The coordinate transformation method for imaging under screen of claim 5, characterized in that, the array arrangement is lateral arrangement and longitudinal arrangement, or the array arrangement is ring arrangement.

7. The coordinate transformation method for imaging under screen of claim 5, characterized in that, an interval between two adjacent point light sources satisfies a condition that point light source total reflection images that are collected by the light sensor do not contact and do not repeat.

8. The coordinate transformation method for imaging under screen of claim 5, characterized in that, the display panel is a liquid-crystal display, an active-matrix organic light-emitting diode display or a micro light-emitting diode display.

9. An electronic device, characterized by: comprising storage and a processor, wherein a computer program is stored in the storage, and the computer program when executed by the processor performs the steps of the method of claim 1.

10. An electronic device, characterized by: comprising storage and a processor, wherein a computer program is stored in the storage, and the computer program when executed by the processor performs the steps of the method of claim 2.

11. An electronic device, characterized by: comprising storage and a processor, wherein a computer program is stored in the storage, and the computer program when executed by the processor performs the steps of the method of claim 3.

12. An electronic device, characterized by: comprising storage and a processor, wherein a computer program is stored in the storage, and the computer program when executed by the processor performs the steps of the method of claim 4.

* * * * *